(12) United States Patent
Shimizu

(10) Patent No.: US 6,839,153 B1
(45) Date of Patent: Jan. 4, 2005

(54) IMAGE READER AND IMAGE READING METHOD

(75) Inventor: Kosuke Shimizu, Ebina (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 09/520,969

(22) Filed: Mar. 8, 2000

(30) Foreign Application Priority Data

Apr. 7, 1999 (JP) .......................................... 11-100542

(51) Int. Cl.[7] .............................................. G06K 15/00

(52) U.S. Cl. ..................................... 358/3.21; 358/1.12

(58) Field of Search .............................. 358/3.21–3.22, 358/1.9, 1.12, 494–498; 382/112

(56) References Cited

U.S. PATENT DOCUMENTS 6,366,358 B1 * 4/2002 Satou et al. ................ 358/1.14
2003/0090742 A1 * 5/2003 Fukuda et al. .............. 358/448

FOREIGN PATENT DOCUMENTS

JP           9-139844         5/1997

* cited by examiner

Primary Examiner—Thomas D. Lee
Assistant Examiner—Stephen Brinich
(74) Attorney, Agent, or Firm—Morgan Lewis & Bockius LLP

(57) ABSTRACT

Even if there may exist a difference in reading density between reading positions, there will be provided an image reader capable of accurately detecting and removing streaks-shaped noise caused by the adhesion of dust particles to the reading unit. A CCD reads an original at each reading position, and image data A and B in each reading position are obtained from an output delay circuit and a shading correction circuit. A streak detection circuit judges a difference A−B between each image data through the use of a threshold corrected on the basis of an average density difference between each image data A and B, and outputs black streak detection data in accordance with the judgment result. A streak removal circuit always outputs the image data A, but if black streak detection data is outputted, image data B corrected on the basis of the average density difference is outputted in place of the image data A.

11 Claims, 12 Drawing Sheets

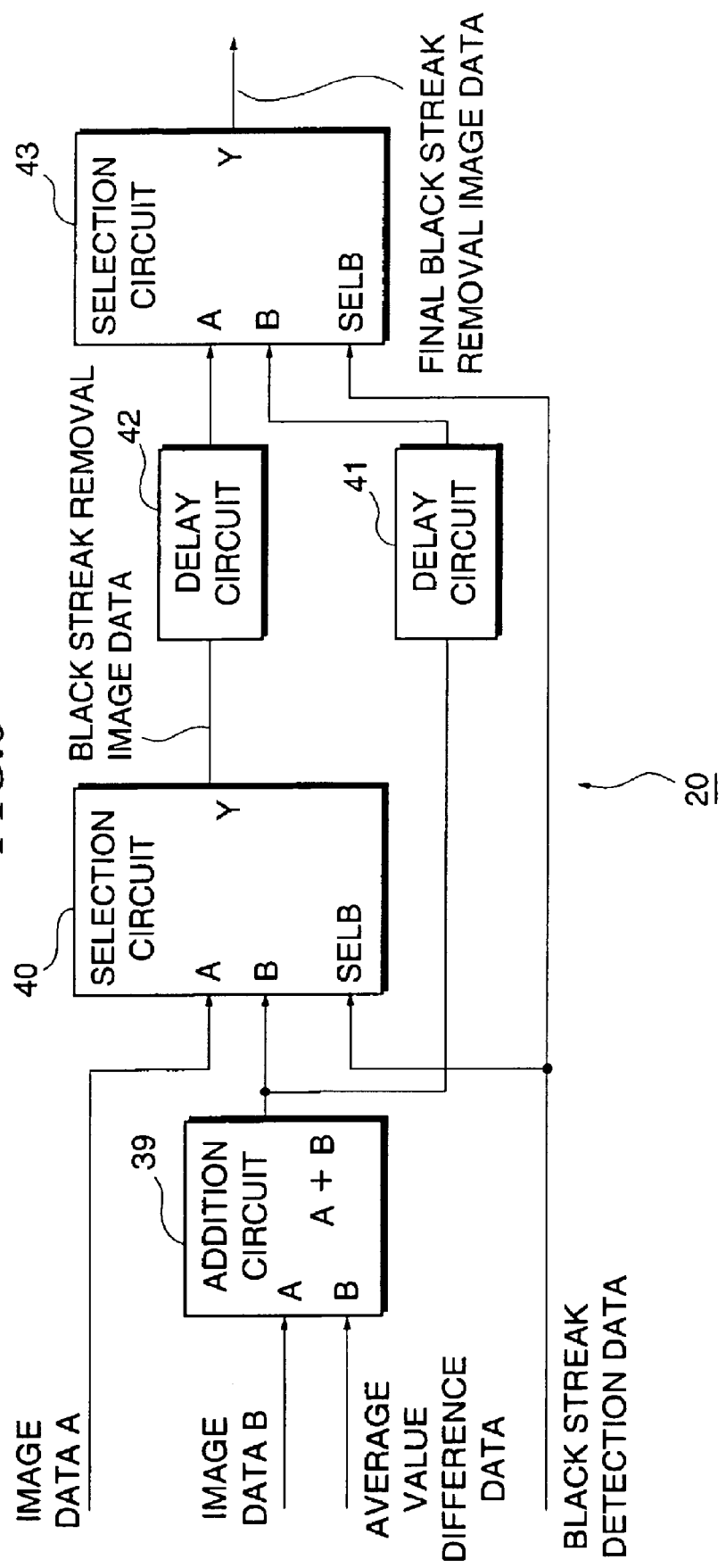

WHEN NO DUST PARTICLES ADHERE

WHEN DUST PARTICLES ADHERE

BLACK STREAK REMOVAL

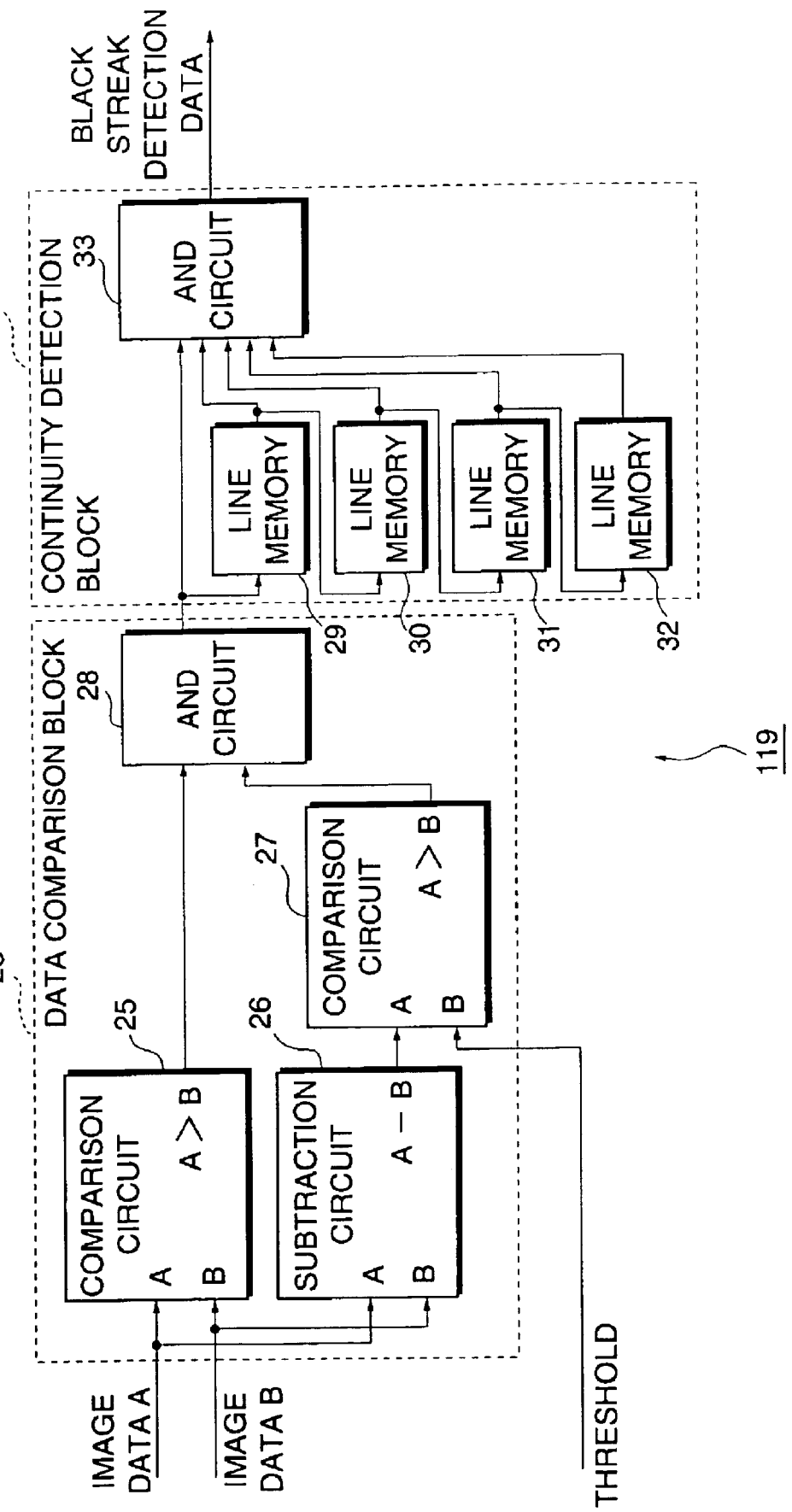

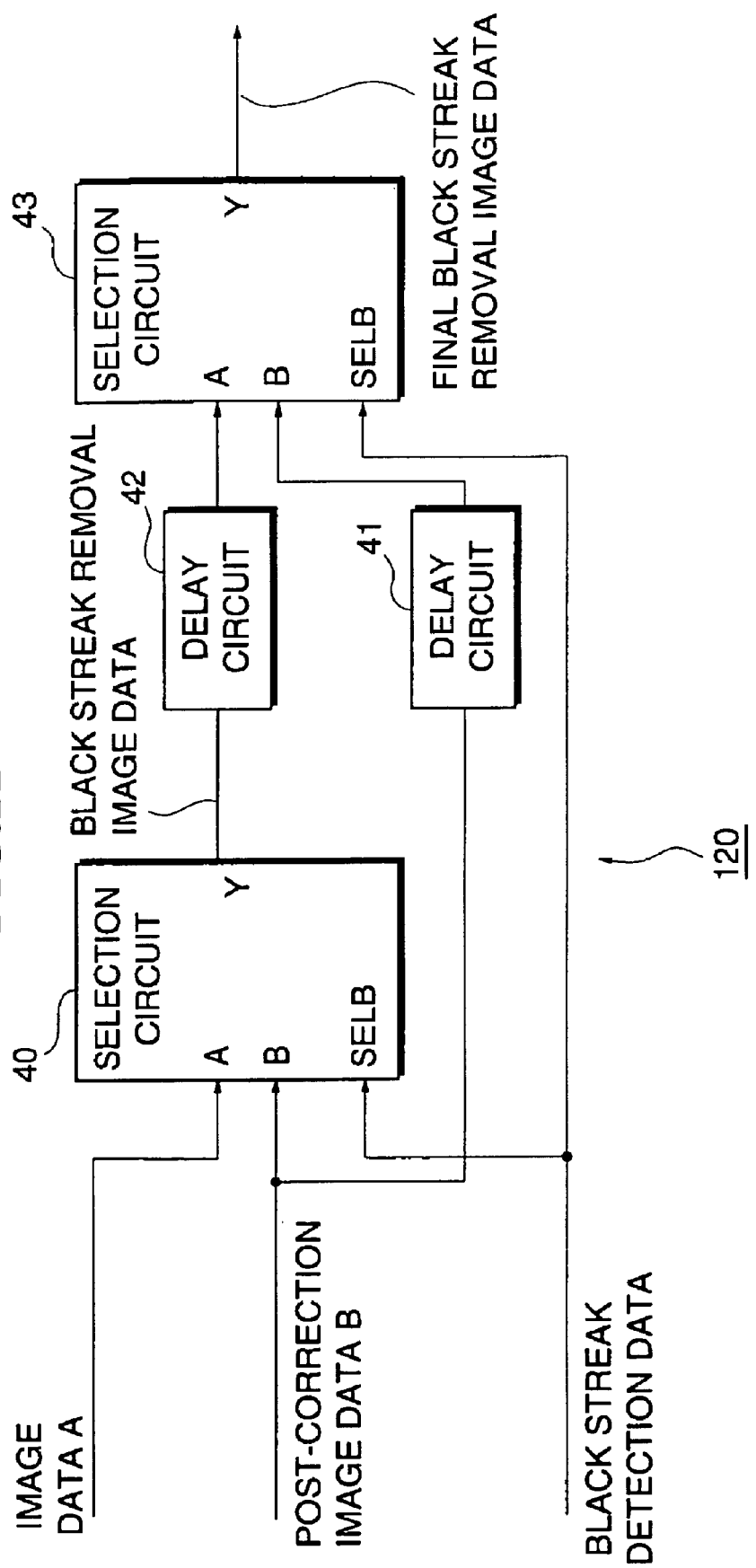

WHEN NO DUST PARTICLES ADHERE

WHEN DUST PARTICLES ADHERE

IMAGE READER AND IMAGE READING METHOD

BACKGROUND OF THE INVENTION

1. Field of the Invention

The present invention relates to an image reader such as a digital copying machine, a facsimile and a scanner and its image reading method.

2. Description of the Prior Art

There have been provided various types of image readers such as a digital copying machine, a facsimile and a scanner which read an original to be conveyed by a conveying device in a predetermined reading position. In these types of image readers, dust particles or the like may adhere to a reading unit. In such cases, when an image is read, the dust particles are read by the reading unit, and therefore, streaks, which are not in the original image but extend in the slow-scanning direction, appear on an output image or a transmitted image (hereinafter, simply referred to as "output image") to be obtained from the image reader.

As a way of solving this problem, there have been proposed a method of giving processing for preventing dust particles or the like from adhering to the surface of contact glass on the reading unit, a method of setting the position of the reading unit to a place where dust particles hardly adhere and the like. These methods, however, cannot overcome a drawback which occurs when dust particles have adhered to the reading unit, that is, a drawback in which streaks due to adhesion of dust particles appear on the output image.

A technique which prevents, when dust particles adhere to the reading unit, the dust particles from affecting an output image has been proposed in, for example, Japanese Published Unexamined Patent Application No. 9-139844.

The outline of an image reader disclosed in the Japanese Published Unexamined Patent Application No. 9-139844 is as follows: First, in the present image reader, an original under conveyance is read in two reading positions slightly apart from each other along a conveying direction of the original. In this in respect, for the sake of convenience in the following description, the first reading position, which the original under conveyance passes through, is called an "upstream-side reading position" and the second reading position, which it passes through, is called a "downstream-side reading positions".

When an image is in this manner read from the original in the two places: upstream-side reading position and downstream-side reading position, in the upstream-side reading position, image data on each fast-scanning line which has been arranged in a slow-scanning direction as shown in, for example, the following:

Pk, Pk+1, Pk+2, Pk+3 . . .

are sequentially obtained.

In contrast, in the downstream-side reading position, image data, which is, for example, d lines behind in phase than this image data, is obtained as follows:

Pk+d, Pk+d+1, Pk+d+2, Pk+d+3 . . . In this respect, a suffix in the image data Pk or the like in this example is the number of the fast-scanning line.

If the assumption is made that dust particles adhered only to a position corresponding to the downstream-side reading position on the contact glass, image data faithful to the original image could be obtained from the upstream-side reading position, while image data affected by dust particles would be obtained from the downstream-side reading position and a difference would occur between both image data.

Thus, in the present image reader, with respect to the image data in the upstream-side reading position, image data having the same phase as the image data in the downstream-side reading position is generated by imparting a delay corresponding to the above-described phase delay d, and this image data is compared with the image data in the downstream-side reading position. If there is a difference between the two, it will be determined that dust particles have adhered to the downstream-side reading position.

Also, in this case, it can be said that, of the image data in the downstream-side reading position, a portion different from the image data in the upstream-side reading position is image data in a portion affected by dust particles. Thus, in the present image reader, by replacing the image data in the portion affected by the dust particles with fixed mask data, streaks to be appeared on the output image are removed.

In the configuration disclosed in the above-described Japanese Published Unexamined Patent Application No. 9-139844, image data pieces in the downstream-side reading position and the upstream-side reading position are binarized respectively, and whether or not dust particles have adhered is determined depending on whether or not these binarization data pieces are different. For this reason, only when either of each image data piece in the downstream-side reading position or the upstream-side reading position is higher than a binarization threshold and the other is lower than the threshold, it is determined that the dust particles have adhered. When both image data pieces exceed the threshold or when they do not exceed the threshold, there is the problem that it is not determined that the dust particles have adhered even if the dust particles have adhered.

As a method which solves this problem and precisely determines the adhesion of dust particles, there can be conceived a method which compares each image data (multilevel data) in the downstream-side reading position and the upstream-side reading position as it is, and determines that dust particles have adhered if a difference between the two exceeds a predetermined threshold. However, there may take place a steady offset between each image data piece in the downstream-side reading position and the upstream-side reading position resulting from the configuration or the like of the image reader. In a situation in which such a steady offset takes place, there is the problem that even if the adhesion of dust particles is determined on the basis of a difference between each image data piece in each reading position, the determination may become incorrect. With reference to FIG. 1, a detailed description of this problem will be made.

FIG. 1 is a view showing the configuration of an original conveying system in the image reader and an optical system for reading an image. In FIG. 1, an original 2 is carried to a conveying roller 4 one sheet at a time by a drawing-in roller 3. The conveying roller 4 conveys the original 2 to a contact glass 5 by changing the original conveying direction. The original 2 is pressed against the contact glass 5 by a back platen 7, and is finally exhausted from the conveying device by an exhaust roller B. The above-described upstream-side reading position and downstream-side reading position are located above the contact glass 5. A reference numeral A in FIG. 1 designates an original image in the upstream-side reading position, and a reference numeral B, an original image in the downstream-side reading position. These original images A and B have their optical paths changed by a first mirror 9, a second mirror 10 and a third mirror 11 respectively, are reduced by a lens 12, and reach CCD 1.

In the configuration shown in FIG. 1, the original 2 is conveyed obliquely downward to the contact glass 5 by the conveying roller 4. At the time of the original reading, an optical path of an original image A in the upstream-side reading position and an optical path of an original image B in the downstream-side reading position are perpendicular to the contact glass 5, but the upstream-side reading position and the downstream-side reading position are provided within a section in which the original 2 is conveyed obliquely with respect to the contact glass 5. Therefore, an optical path length between the upstream-side reading position and CCD 1 becomes longer than that between the downstream-side reading position and CCD 1. For this reason, even if no dust particles adhere to the contact glass 5, a density value of a read image A in the upstream-side reading position becomes higher than a density value of a read image B in the downstream-side reading position as exemplified in FIG. 12A, and an offset ΔD having a predetermined size takes place between image data corresponding to each reading position.

When a difference obtained by deducting the density value of the read image A in the upstream-side reading position from the density value of the read image B in the downstream-side reading position is compared with the threshold to determine adhesion of dust particles, it becomes difficult to determine the adhesion of dust particles because if dust particles adhere to the contact glass in the downstream-side reading position, a difference between density values of each read image is reduced under the influence of the offset ΔD. FIG. 12B shows its example. If the assumption is made that there is no offset ΔD described above between each reading position, there would take place a comparatively large difference ΔD1 between density values of read images in each reading position if dust particles adhere to the contact glass in the downstream-side reading position. In a configuration shown in FIG. 2, however, since there takes place the offset ΔD between each reading position, the difference between density values of read images in each reading position decreases to ΔD2 from ΔD1, and it becomes difficult to determine the adhesion of dust particles.

In the configuration disclosed in the Japanese Published Unexamined Patent Application No. 9-139844, by replacing image data affected by dust particles with fixed mask data, the streaks on an output image have been removed, but this method has a problem that the output image is deteriorated because a density difference takes place between an image corresponded to the mask data and images all around the image.

As a remedy, there can be conceived a method in which, in a case where dust particles have been found to adhere, image data of the read image, in which, of the read images A and B, it has been found that no dust particles adhere, is selected to thereby obtain image data from which the dust particles have been removed. When, however, this method is executed under such circumstance that the offset ΔD takes place, the image data affected by dust particles is to be replaced with image data having different density therefrom, and the output image will be deteriorated. For example, it is assumed in the configuration shown in FIG. 1 that when it is found that no dust particles have adhered, image data of the read image B in the downstream-side reading position is selected, while when it is found that dust particles have adhered to the downstream-side reading position, image data of the read image A in the upstream-side reading position is selected. In this case, since the image data of the read image A has been selected in place of the image data of the read image B, it is possible to erase clear streaks caused by the dust particles, but thinly black streaks remain in a portion in which the image data has been replaced because a density value for the read image A is higher than that for the read image B.

SUMMARY OF THE INVENTION

The present invention has been made in view of the above circumstances and provides an image reader and an image reading method capable of accurately detecting, even if there may exist a density difference in each read image corresponding to the same image in plural reading positions, streaks-shaped noise caused by adhesion of dust particles to a reading unit, or the like to remove it from the output image.

According to an aspect of the present invention, an image reader, having a conveying part that conveys an original, and first and second reading parts that read the original conveyed by the conveying part, in which if the same image has been read by the first and second reading parts, a density value of a read image obtained from the first reading part is higher than a density value of a read image to be obtained from the second reading part, includes a noise detection part that judges, if a difference between density values of the same area on the original read by the first and second reading parts, respectively, exceeds a predetermined threshold, that a streaks-shaped noise is contained in the read image obtained by the first reading part, and a noise removal part that generates, if the noise detection part judges that the streaks-shaped noise is not contained in the read image obtained by the first reading part, an output image using the read image obtained by the first reading part, and that generates, if the noise detection part judges that that the streaks-shaped noise is contained in the read image obtained by the first reading part, the output image using the read image obtained by the second reading part.

According to this configuration, the presence or absence of the streaks-shaped noise can be found by judging a difference obtained by deducting the read image in the second reading position from the read image in the first reading position, in which the reading density value is originally high, and therefore, it is possible to reliably detect streaks-shaped noise caused by adhesion of dust particles, and to replace it with a read image containing no noise in the second reading position. Also, the read image in the second reading position has a lower density value than the read image in the first reading position containing no noise caused by adhesion of dust particles, and therefore, a portion in which the read image has been replaced becomes thinly white noise, but such noise has an advantage that it is not conspicuous.

According to another aspect of the present invention, the image reader includes a threshold correction part that determines an average density difference between average densities of the same area on the original read by the first and second reading parts, respectively, and that corrects a predetermined threshold on the basis of the average density difference and outputs the corrected threshold, and a noise detection part that judges, if a difference between density values of the same area on the original read by the first and second reading parts, respectively, exceeds the threshold outputted from the threshold correction part, that a streaks-shaped noise is contained in the read image obtained by the first reading part.

According to this configuration, when judging the presence or absence of any noise on the basis of a difference obtained by deducting the read image in the second reading position from the read image in the first reading position, there is used a threshold corrected by an average density difference between read images in each reading position, and therefore, it is possible to accurately judge the presence or absence of the noise.

In this aspect of the present invention, the image reader may further includes a correction part that corrects the read image obtained by the second reading part on the basis of the average density difference determined by the threshold correction part, and a noise removal part that generates, if the noise detection part judges that the streaks-shaped noise is not contained in the read image obtained by the first reading part, an output image using the read image obtained by the first reading part, and that generates, if the noise detection part judges that that the streaks-shaped noise is contained in the read image obtained by the first reading part, the output image using the read image obtained by the second reading part, which has been subjected to the correction by the correction part.

According to this configuration, since the read image containing noise obtained in the first reading position is replaced with an image obtained by correcting the read image obtained in the second reading position on the basis of the average density difference, it is possible to eliminate any density difference between the replacement point and its surrounding portions.

According to yet another aspect of the present invention, the image reader, having a conveying part that conveys an original, and first and second reading parts that read the original to be conveyed by the conveying part, in which if the same image has been read by the first and second reading parts, a density value of a read image to be obtained from the first reading part is higher than a density value of a read image to be obtained from the second reading part, includes a correction part that corrects the read image of either the first or second reading part to reduce an average density difference between average densities of the same area on the original read by the first and second reading parts, respectively, and a noise detection part that judges, after the read image obtained by either the first or second reading part has been corrected by the correction part, if a difference between density values of the same area on the original read by the first and second reading parts, respectively, exceeds a predetermined threshold, that a streaks-shaped noise is contained in the read image obtained by either the first or second reading part that has a higher density value.

According to this configuration, read images in each reading position are corrected so as to eliminate the average density difference, the presence or absence of streaks-shaped noise is judged on the basis of a difference between density values for each read image after this correction, and therefore, streaks-shaped noise caused by adhesion of dust particles can be reliably detected.

In this aspect of the present invention, the image reader may further includes a noise removal part that generates, if the noise detection part judges that the streaks-shaped noise is not contained in the read image obtained by the first or second reading part having the higher density value, an output image using the read image obtained by the reading part having the higher density value, which has been subjected to the correction by the correction part, and that generates, if the noise detection part judges that the streaks-shaped noise is contained in the read image obtained by the reading part having the higher density value, the output image using the read image obtained by the other reading part having lower density value, which has been subjected to the correction by the correction part.

According to this configuration, when noise is detected, any replacement point can be made inconspicuous because the noise is removed by replacement with each read image after correction having no average density difference.

According to still another aspect of the present invention, an image reading method that reads an image by a first reading part from an area on an original conveyed by a conveying part, and then reads the image by a second reading part from the same area on the original to generate an output image, in which a density value of a read image obtained by the second reading part is lower than a density value of a read image obtained by the first reading part, includes the steps of judging whether a difference between the density values of the read images obtained by the first and second reading parts, respectively, exceeds a predetermined threshold, and generating, if it is judged that the difference does not exceed the predetermined threshold, the output image using the read image obtained by the first reading part, and generating, if it is judged that the difference exceeds the predetermined threshold, the output image using the read image obtained by the second reading part.

According to still another aspect of the present invention, an image reading method that reads an image by a first reading part from an area on an original conveyed by a conveying part, and then reads the image by a second reading part from the same area on the original to generate an output image, in which a density value of a read image obtained by the second reading part is lower than a density value of a read image obtained by the first reading part, includes the steps of determining an average density difference between average densities of the same area on the original read by the first and second reading parts, respectively, correcting a predetermined threshold and the read image obtained by the second reading part on the basis of the average density difference, judging whether a difference between the density values of the read images obtained by the first and second reading parts, respectively, exceeds the corrected threshold, and generating, if it is judged that the difference does not exceed the corrected threshold, the output image using the read image obtained by the first reading part, and generating, if it is judged that the difference exceeds the corrected threshold, the output image using the read image obtained by the second reading part.

According to still another aspect of the present invention, an image reading method that reads an image by a first reading part from an area on an original conveyed by a conveying part, and then reads the image by a second reading part from the same area on the original to generate an output image, in which a density value of a read image obtained by the second reading part is lower than a density value of a read image obtained by the first reading part, includes the steps of correcting at least one of the read images obtained by the first and second reading parts, respectively, to reduce an average density difference between average densities of the same area on the original read by the first and second reading parts, respectively, judging whether a difference between the density values of the read images, at least one of which has been corrected, obtained by the first and second reading parts, respectively, exceeds a predetermined threshold, and generating, if it is judged that the difference does not exceed the predetermined threshold, the output image using the read image obtained by the first reading part, and generating, if it is judged that the difference exceeds the predetermined threshold, the output image using the read image obtained by the second reading part.

BRIEF DESCRIPTION OF THE DRAWINGS

Preferred embodiments of the present invention will be described in detail based on the followings, wherein:

FIG. 6 is a block diagram showing an example of a configuration of a streak removal circuit in the first embodiment;

FIG. 10 is a block diagram showing a configuration of a streak detection circuit according to the second embodiment;

FIG. 11 is a block diagram showing an example of a configuration of a streak removal circuit according to the second embodiment.

DETAILED DESCRIPTION OF THE PREFERRED EMBODIMENTS

Hereinafter, with reference to the drawings, the description will be made on embodiments according to the present invention.

A. First Embodiment

Figure 1:
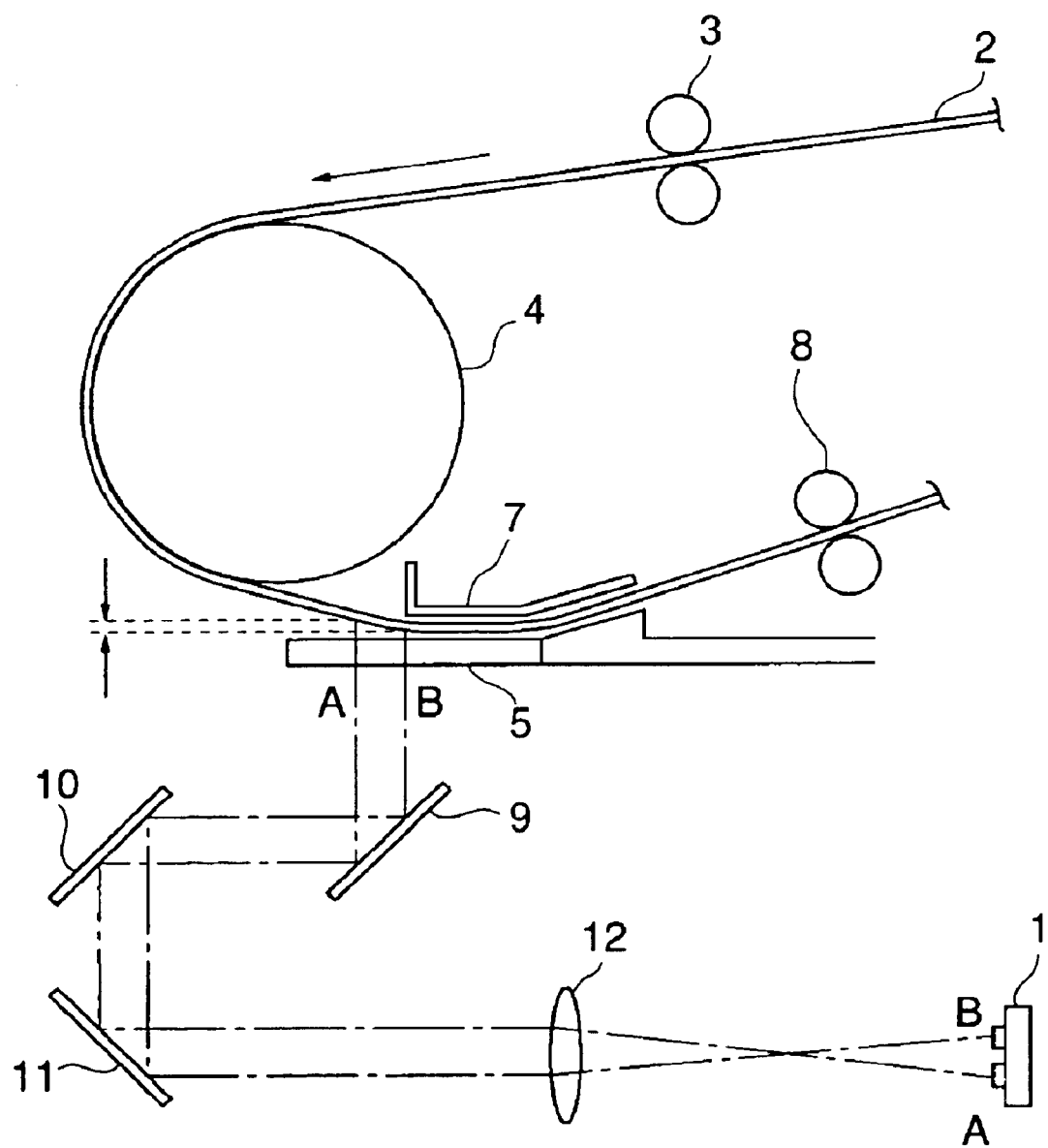
FIG. 1 is a view showing a configuration of an original conveying system and an optical system for reading an original in an image reader according to a first embodiment of the present invention.

FIG. 1 is a block diagram showing a configuration of an image reader according to a first embodiment of the present invention. In FIG. 1, a reference numeral CCD 1 designates a part for reading an original to be conveyed by an original conveying system shown in FIG. 1. In the present embodiment, this CCD 1 is driven through a driving signal from a CCD driving circuit 13, whereby an original image is read in each of an upstream-side reading position and a downstream-side reading position on a conveying path of the original to output an analog image signal A in the upstream-side reading position and an analog image signal B in the downstream-side reading position.

The configuration of the original conveying system and the configuration of the optical system between each reading position and CCD 1 on the original conveying path are as already described referring to FIG. 1.

Figure 3:
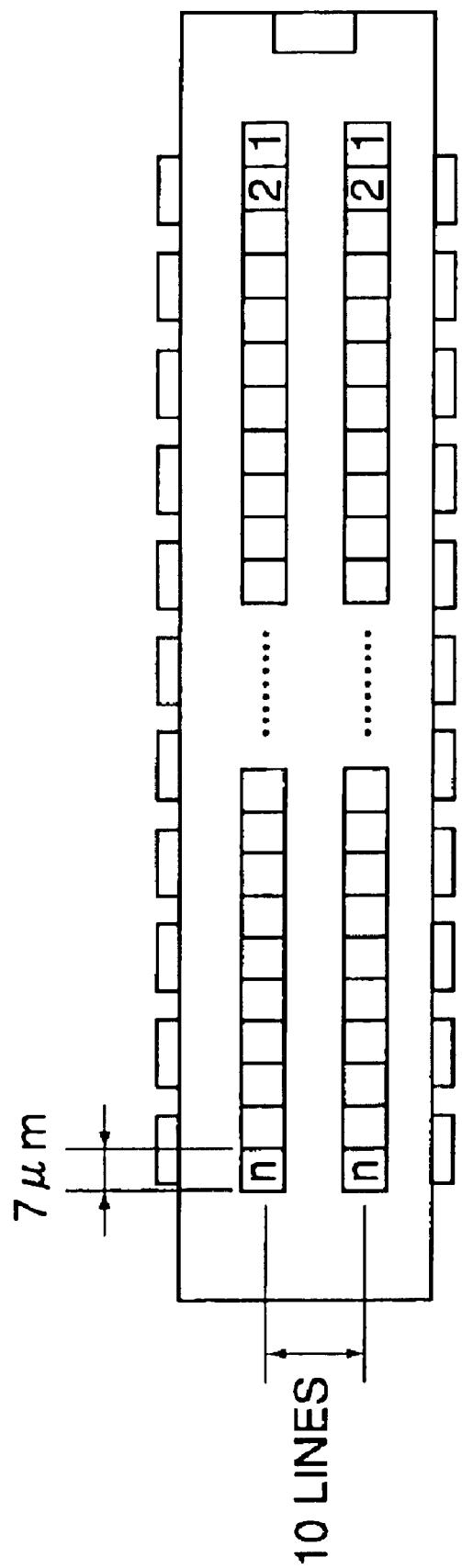
FIG. 3 is a view showing a configuration of CCD in the first embodiment.

On a package for the CCD 1, two rows of line sensors, in each of which N pieces of 7 $\mu$m×7 $\mu$m photo-diodes are arranged, are formed as shown in FIG. 3. Each of these line sensors is a part for reading an original image in each reading position on the upstream side and on the downstream side respectively. Each line sensor is spaced apart by 70 $\mu$m from each other. In contrast, the upstream-side reading position and the downstream-side reading position on the original conveying path are spaced apart by 423 $\mu$m.

Each original image (linear image for one line each) in each of these reading positions is reduced by passing it through the optical system shown in FIG. 1 to form an image on each line sensor.

In the line sensor corresponding to the upstream-side reading position, current, which flows through n-pieces of phototransistors constituting the line sensor, is sequentially detected for each line period (fast-scanning period), and is outputted as an analog image signal A representing the density of each pixel of one line (n pixels). Similarly, even in the line sensor corresponding to the downstream-side reading position, current for flowing through n-pieces of phototransistors is sequentially detected for each line period (fast-scanning period) to output an analog image signal B representing the density of each pixel of one line (n pixels) An interval 70 $\mu$m between each line sensor corresponding to each reading position on the upstream side and on the downstream side is an interval corresponding to scanning lines for 10 lines. Therefore, if there are no fluctuations in the original conveying velocity, the analog image signal B becomes an image signal which lags the analog image signal A by a phase lag corresponding to 10 lines.

Figure 2:
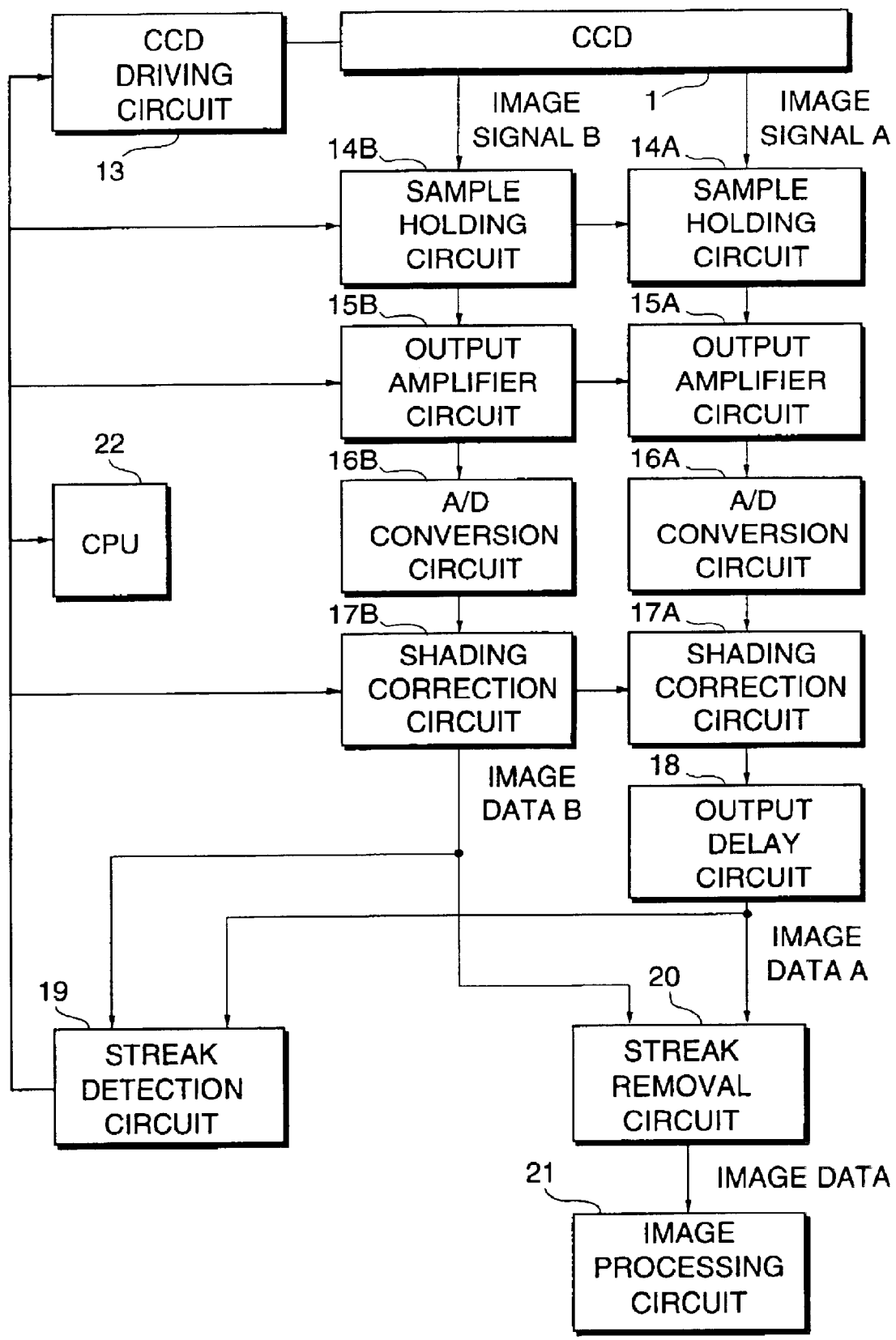
FIG. 2 is a block diagram showing the configuration of image reader according to the first embodiment.

In FIG. 2, in the latter part of the CCD 1, there are provided a signal processing system including a sample holding circuit 14A, an output amplifier circuit 15A, an AD conversion circuit 16A and a shading correction circuit 17A, and a signal processing system including a sample holding circuit 14B, an output amplifier circuit 15B, an AD conversion circuit 16B and a shading correction circuit 17B. The former is a signal processing system corresponding to an image signal A in the upstream-side reading position, and the latter is a signal processing system corresponding to an image signal B in the downstream-side reading position.

Analog image signals A and B to be obtained from the CCD 1 are sampled by the sample holding circuits 14A and 14B respectively, thereafter are amplified to an appropriate level respectively by the output amplifier circuits 15A and 15B, and are converted into digital image data A and B respectively by the AD conversion circuits 16A and 16B. These digital image data pieces A and B are subjected to corrections corresponding to sensitivity variations of CCD 1 and distribution characteristic of quantity of light of the optical system by the shading correction circuits 17A and 17B. An outline of each signal processing system corresponding to the image signals A and B has just been described above.

An output delay circuit 18 delays image data A to be outputted from the shading correction circuit 17A by delay time corresponding to 10 lines to output as image data having the same phase as the image data B. A streak detection circuit 19 is a part, which detects black streak-shaped noise contained in the image data A by comparing the image data A to be outputted from the output delay circuit 18 with the image data B to be outputted from the shading correction circuit 17B to output black streak detection data. Also, a streak removal circuit 20 is a part, which generates image data obtained by removing any black streak-shaped noise from the image data A on the basis of the black streak detection data from the streak detection circuit 19 to output it to an image processing circuit 21. In this respect, the detail of the streak detection circuit 19 and the streak removal circuit 20 will be described later.

The image processing circuit 21 is a part whereby image data to be outputted from the streak removal circuit 20 is subjected to image processing such as scaling, texture removal and binarization which is required in an apparatus (such as a digital copying machine and a scanner) mounted with this image reader.

A CPU 22 is a part which controls each portion of this image reader. Concretely, the CPU 22 sets a period for driving of the CCD 1 to be performed by a CCD driving circuit 13, controls gains of the output amplifier circuits 15A and 15B, and controls the shading correction circuits 17A and 17B, a constant of the streak detection circuit 19 (to be described later) and the like.

The entire configuration of the image reader according to the present embodiment has just been described above.

Next, with reference to FIG. 4, a description will be made on the streak detection circuit 19. The streak detection circuit 19 according to the present embodiment has a data comparison circuit 23, a continuity detection block 24 and a threshold correction circuit 34.

To the data comparison block 23, image data pieces A and B representing density of pixel for n pieces of pixels are respectively inputted for each line period (fast-scanning period). The image data A corresponds to the original image, which has been read in the upstream-side reading position, but is subjected to a delay corresponding to 10 lines by the output delay circuit 18. Therefore, if there is no fluctuation in the original conveying velocity, the image data pieces A and B to be inputted to the data comparison block 23 represent read images corresponding to the same line on the original respectively, and both are those which should originally coincide with each other. When dust particles and the like adhere to the upstream-side reading position, however, of image data A corresponding to the upstream-side reading position, image data of the pixel corresponding to areas of dust particles adhered is affected by them, and density of the pixel to be represented by the image data A seems to become noticeably higher than density of the pixel to be represented by the image data B. In this data comparison block 23, if the image data A is noticeably higher than the image data B, a signal to the effect that the image data A may be affected by the dust particles is generated on the basis of such a precondition. It will be further detailed below.

A comparison circuit 25 in this data comparison block 23 compares the image data A with the image data B, and if the former is larger than the latter, outputs a signal "1", and otherwise, outputs a signal "0". Also, a subtraction circuit 26 subtracts the image data B from the image data A to output a difference A–B between image data A and B. A comparison circuit 27 compares the difference A–B determined by the subtraction circuit 26 with a threshold obtained by computing by a threshold computing circuit 34, and outputs a signal "1" if the difference A–B is higher than the threshold, and otherwise, outputs a signal "0". In this respect, the detail of the threshold computing circuit 34 will be described later. An AND circuit 28 receives an output signal from the comparison circuit 25 and an output signal from the comparison circuit 27 to output a logical product of the two. That is, if the density of a pixel corresponding to the image data A is higher than the density of a pixel corresponding to the image data B and there is a density difference higher than a predetermined threshold between the both pixels, the AND circuit 28 outputs a signal "1". And otherwise, it outputs a signal "0". In this respect, the output signal from this AND circuit 28 will be called "dust particles judgment bit" for the sake of convenience in the following description.

As already described, to the data comparison block 23, image data pieces A and B of one line (n pixels) are respectively inputted for each line period. In the data comparison block 23, the above-described process is performed for each pixel constituting one line, and n bits of serial data including a dust particles judgment bit representing, for each pixel, whether or not the image data A is affected by dust particles, are outputted from the AND circuit 28 for each line period.

Figure 4:
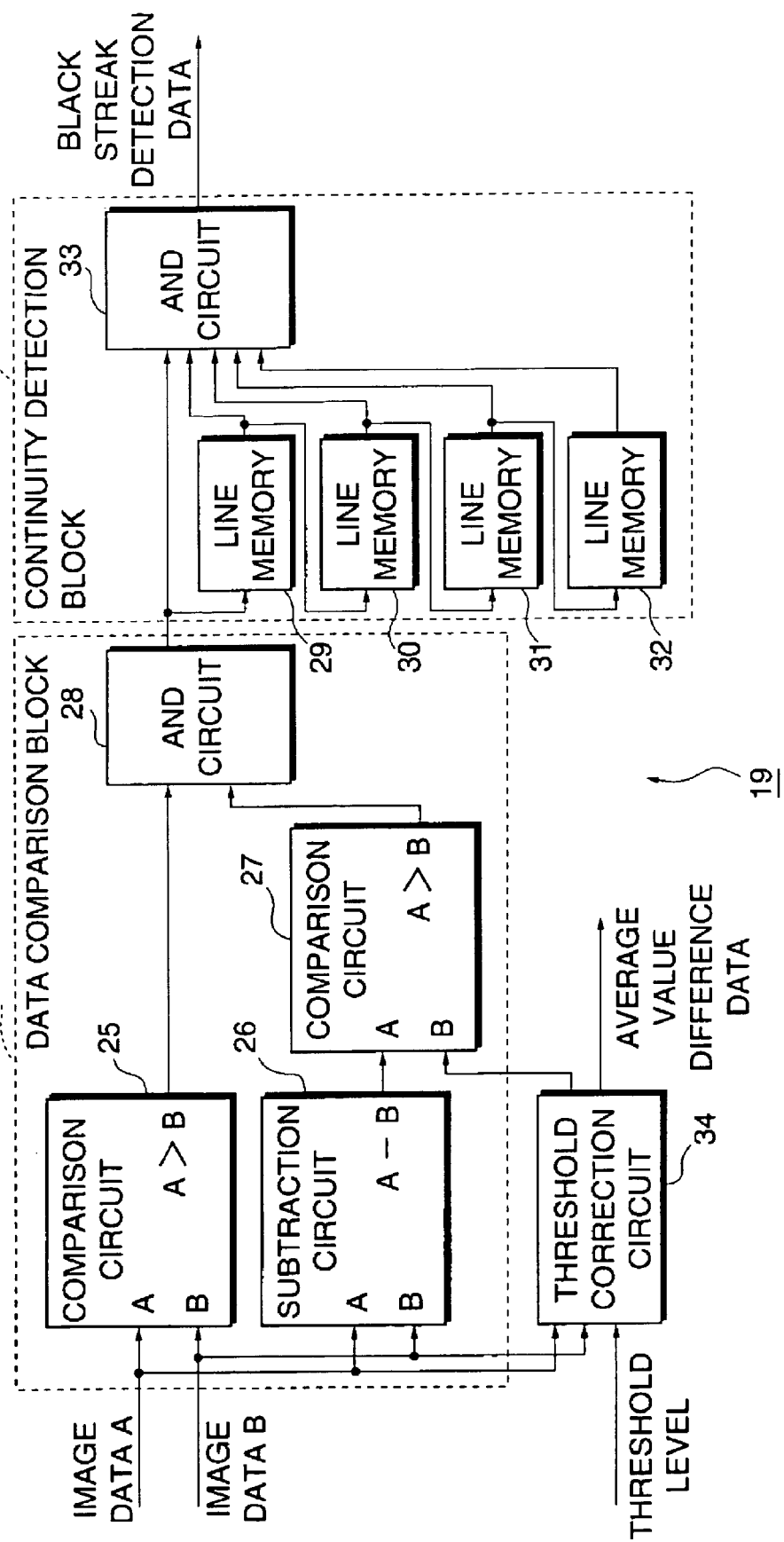
FIG. 4 is a block diagram showing a configuration of a streak detection circuit in the first embodiment.

The continuity detection block 24 in FIG. 4 is provided in the latter part of the data comparison block 27. This continuity detection block 24 includes four line memories 29 to 32 and an AND circuit 33. The line memories 29 to 32 are constructed of a FIFO (First-In First-Out) memory respectively. Each of these line memories is cascade-connected as shown, and constitute one shift register which sequentially shifts a dust particles judgment bit to be outputted from the data comparison block 23. Also, each line memory is constructed so as to be able to store n bits of serial data, and data inputted into each line memory is outputted from the line memory concerned after one line period.

Therefore, when a dust particle judgment bit corresponding to a pixel is outputted from the AND circuit 28 of the data comparison block 23, each dust particle judgment bit corresponding to each pixel 1 to 4 lines ahead of the pixel concerned respectively will be outputted from the line memories 29 to 32. If all dust particles judgment bits to be outputted from the AND circuit 28 of the data comparison block 23 and the line memories 29 to 32 are "1", that is, if judgment to the effect that pixels having the same position in the fast-scanning direction are affected by dust particles has been given for five successive lines, the AND circuit 33 outputs a signal "1", and otherwise, outputs a signal "0". An output signal from the AND circuit 33 is black streak detection data.

Figure 5:
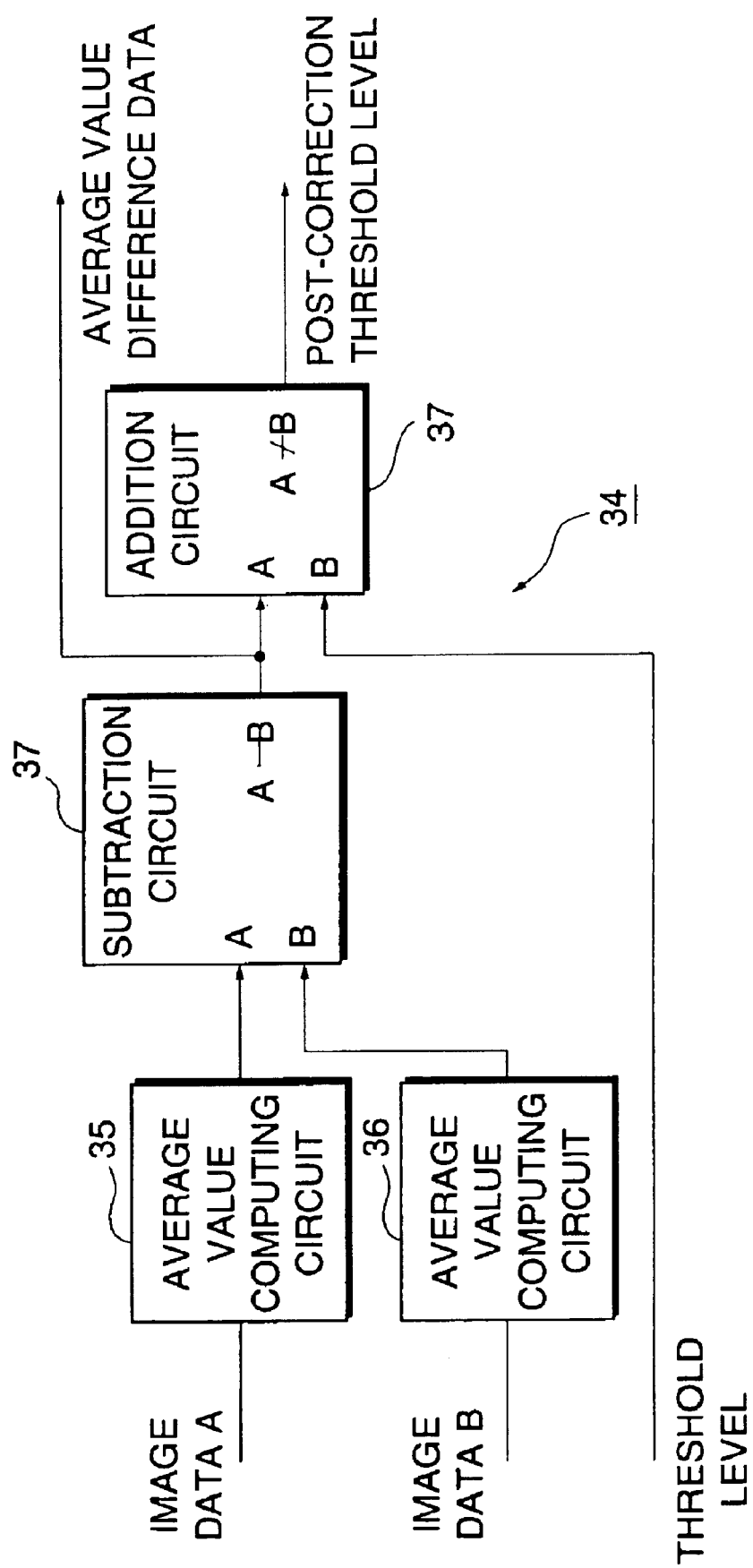
FIG. 5 is a block diagram showing a configuration of a threshold correction circuit in the first embodiment.

Next, with reference to FIG. 5, a description will be made on a configuration of the threshold correction circuit 34. The threshold correction circuit 34 according to the present embodiment is constructed of average value computing circuits 35 and 36, a subtraction circuit 37 and an addition circuit 38.

In a case where an original image is read in two different reading positions by an original conveying device as already described referring to FIG. 1, when each optical path length between each reading position and the CCD sensor 1 is different from each other, an offset in density takes place between read images obtained from each reading position even if the same original image is read. This offset differs depending on the configuration of the image reader and the reading position.

The threshold correction circuit 34 is a circuit in which there is performed correction for reflecting this offset of reading density in a threshold used in the data comparison block 23. In the average value computing circuits 35 and 36 in this threshold correction circuit 34, there are respectively inputted image data pieces A and B corresponding to the same image obtained in the upstream-side reading position and the downstream-side reading position. The average value computing circuit 35 determines an average value for 64 pixels on the image data A. Also, the average value computing circuit 36 determines an average value for the same pixel number as the average value computing circuit 35, that is, for image data B for 64 pixels. When the average value for the image data B determined by the average value computing circuit 36 is deducted from the average value for the image data A determined by the average value computing circuit 35, and each density value for image data A and B obtained from the same point on the original is compared, a subtraction circuit 37 outputs average value difference data indicating how much the former is higher than the latter in average. This average value difference data corresponds to the above-described offset. A predetermined threshold level to be given from the CPU 22 is subjected to correction to add average value difference data to be obtained from this subtraction circuit 37 by the addition circuit 38. The threshold level after the correction to be obtained from the addition circuit 38 is supplied to the comparison circuit 27 in the data comparison block 23. Also, the average value difference data is thus used to correct the threshold, and in addition, is also sent to the streak removal circuit 20 to be used for processing for removing streaks.

Next, with reference to FIG. 6, a description will be made on a configuration of the streak removal circuit 20. The streak removal circuit 20 is, as shown in FIG. 6, constructed of an addition circuit 39, a selection circuit 40, delay circuits 41 and 42, and a selection circuit 43.

The addition circuit 39 adds the image data B to the average value difference data obtained by computing in the threshold correction circuit 34 for outputting. The selection circuit 40 selects the image data A if black streak detection data to be outputted from the streak detection circuit 19 is "0", and selects the image data from the addition circuit 39 if it is "1", and outputs the data selected in this manner as the black streak removal image data. The delay circuit 41 delays the image data from the addition circuit 39 by a 4-line period for outputting. Also, the delay circuit 42 delays the black streak removal image data from the selection circuit 40 by a 4-line period for outputting. The selection circuit 43 selects the black streak removal image data from the delay circuit 42 if the black streak detection data to be outputted from the streak detection circuit 19 is "0", and selects the image data B subjected to density correction from the delay circuit 41 if it is "1", and outputs the data selected in this manner as the final black streak removal image data.

In short, the streak removal circuit 20 described above outputs the image data A as it is if the black streak detection data is "0". If, however, the black streak detection data becomes "1" and it has been found that black streaks would appear on the output image when the image data A is used, going back 4 lines, the average value difference data will be added in place of the image data A, to thereby output the image data B (that is, black streak removal image data) subjected to density correction. Going back to before the 4-line period in this manner, the image data is switched. This is because the switching of the black streak detection data from "0" to "1" is delayed by the 4-line period as compared with timing at which black streaks appear on the output image. The delay circuits 41 and 42 and the selection circuit 43 are added in the latter part of the selection circuit 40 in order to go back a 4-line period for switching the image data.

The detail of the configuration of the image reader according to the present embodiment has just been described above.

Figure 7A:
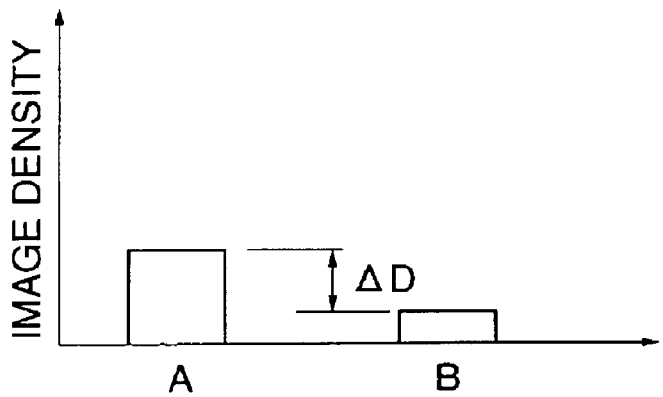
FIGS. 7A, 7B and 7C are explanatory views for illustrating an operation of an image reader according to the first embodiment.

Next, with reference to FIG. 7, a description will be made on an operation of the present embodiment.

In the present embodiment, depending upon whether or not the image data A (corresponding to the upstream-side reading position) from the output delay circuit 18 is larger than the image data B (corresponding to the downstream-side reading position) from the shading correction circuit 17B and a value obtained by deducting the image data B from the image data A exceeds a threshold from the threshold correction circuit 34, it is judged in the streak detection circuit 19 whether or not there are streaks caused by dust particles on the image data A, and black streak detection data indicating the result is outputted.

As shown in FIG. 1, the optical path length between the upstream-side reading position and the CCD 1 is longer than the optical path length between the downstream-side reading position and the CCD 1. For this reason, even when no dust particles have adhered to the contact glass 5, the image data A is larger than the image data B as exemplified in FIG. 7A, and an offset $\Delta D$ having a predetermined size takes place between the both image data pieces.

Figure 7B:
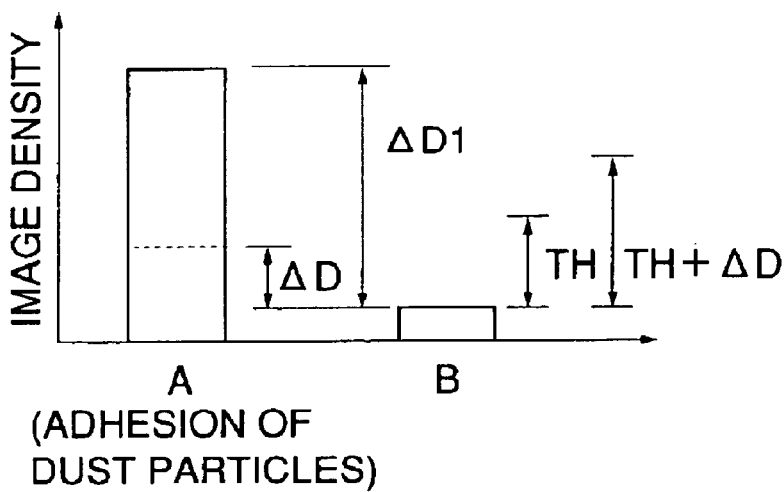
Figure 7C:
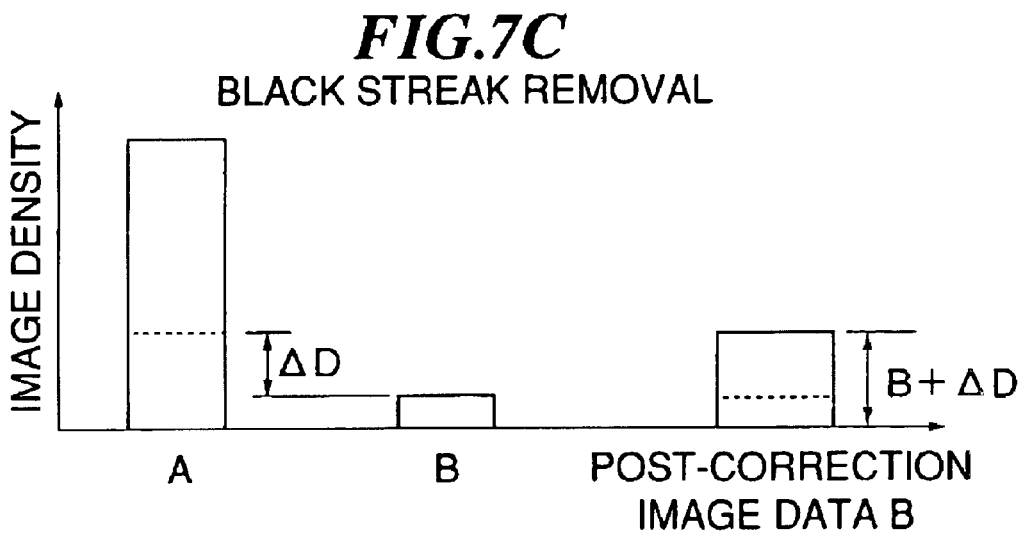

In such a situation, when dust particles adhere to the upstream-side reading position, the image data A, which is originally larger than the image data B, becomes even larger under the influence of dust particles adhered, the image data A exceeds the image data B by a large amount, and a large difference $\Delta D1$ takes place between the two as exemplified in FIG. 7B. For this reason, an output signal from the comparison circuit 25 in the streak detection circuit 19 reliably becomes "1".

On the other hand, in the threshold correction circuit 34 within the streak detection circuit 19, an average value for 64 pixels of the image data B is deducted from an average value for 64 pixels of the image data A to obtain average value difference data corresponding to the offset $\Delta D$. A threshold TH from the CPU 22 is subjected to correction to add this average value difference data, and the threshold after this correction TH+$\Delta D$ is supplied to the comparison circuit 27. In the comparison circuit 27, a difference between the image data A and the image data B is compared with the post-correction threshold TH+$\Delta D$ (See FIG. 7B), and when the former exceeds the latter, a signal "1" is outputted. When each output signal from both the comparison circuits 25 and 27 is "1", the AND circuit 28 outputs a dust particle judgment bit "1". Thus, when this dust particle judgment bit "1" is continuously outputted in the slow-scanning direction, black streak detection data "1" is outputted from the AND circuit 33, and is supplied to the streak removal circuit 20.

When this black streak detection data "1" is outputted, the post-correction image data B obtained by adding the average value difference data to the image data B is selected by the selection circuit 40 in the streak removal circuit 20, is outputted as black streak removal image data, and this is outputted through the selection circuit 43 as final black streak removal image data.

The image data B, which is a basis of the final black streak removal image data, is originally the offset $\Delta D$ smaller than the image data A. Since, however, the image data B is subjected to correction to add the average value difference data as described above, there can be obtained the final black streak removal image data having the substantially same density as the image data A when no dust particles have adhered thereto (See FIG. 7C).

In the present embodiment in this manner, in a configuration in which the image data A becomes larger than the image data B if no dust particles adhere, by comparing a difference obtained by deducting the image data B from the image data A with the threshold, the presence or absence of black streaks is judged, and moreover, this comparison is made using a threshold corrected by a difference between average values for each image data piece. Therefore, it is possible to accurately judge whether or not black streaks under the influence of adhesion of dust particles are generated.

In addition, when an output image is formed using the image data A and black streak detection data is outputted, it is always replaced with the image data B corrected in density by the average value difference data, and therefore, it is possible to prevent any drawback in which this replacement portion becomes more thinly black than the surroundings.

In this respect, although in the present embodiment, the density of the image data B has been corrected, it is possible ah to omit this density correction, to use the image data B as it is as black streak removal data and to replace the image data A with it. In this case, since the image data B is smaller than the image data A when no dust particles adhere, noise, in which the replacement portion becomes thinly white due to this replacement, appears on the output image but such noise does not become conspicuous.

B. Second Embodiment

Figure 8:
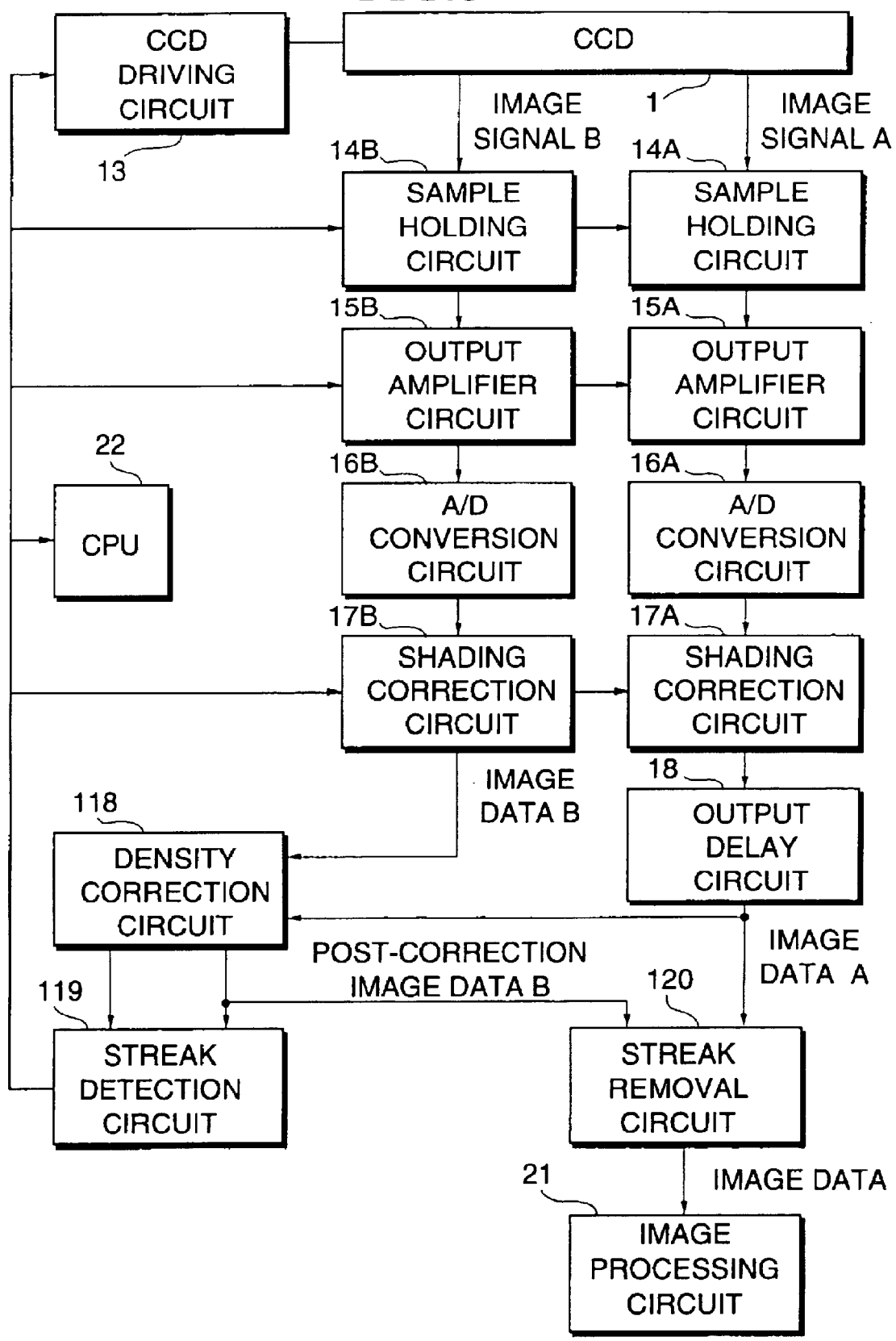
FIG. 8 is a block diagram showing a configuration of an image reader according to a second embodiment of the present invention.

FIG. 8 is a block diagram showing the configuration of an image reader according to a second embodiment of the present invention. In this embodiment, the streak detection circuit 19 and the streak removal circuit 20 are replaced with a streak detection circuit 119 and a streak removal circuit 120 respectively, and a density correction circuit 118 is added. In other respects, the configuration of the present embodiment is quite the same as that of the first embodiment.

Figure 9:
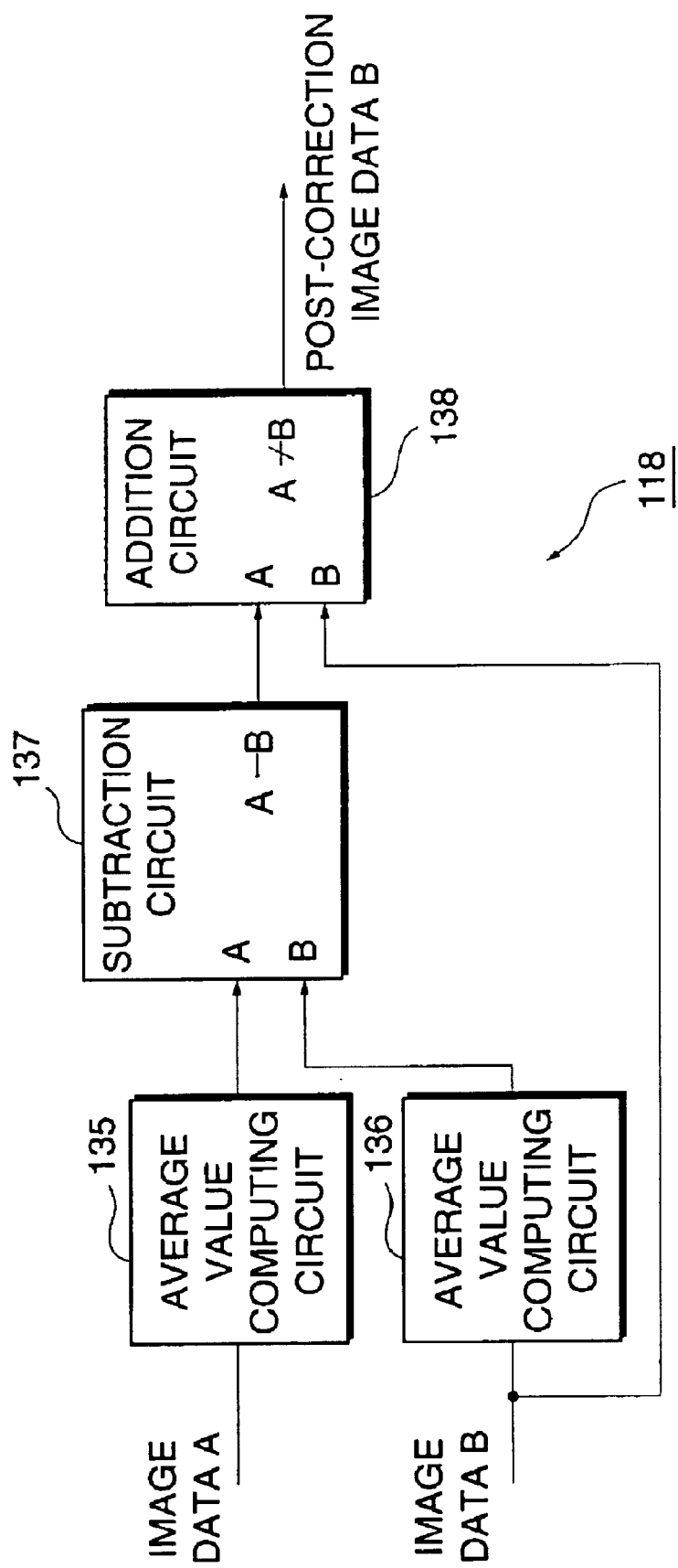
FIG. 9 is a block diagram showing a configuration of a density correction circuit according to the second embodiment.
Figure 12A:
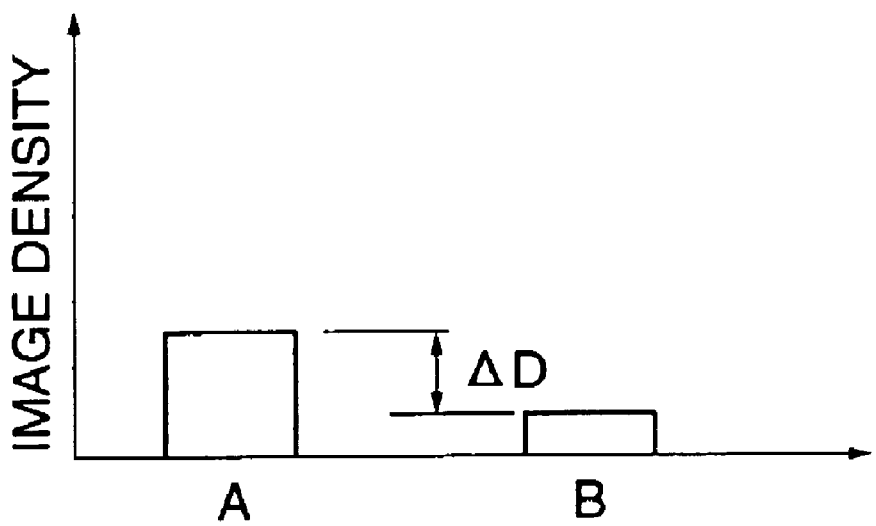
FIGS. 12A and 12B are explanatory views for illustrating problems of the conventional image reader.
Figure 12B:
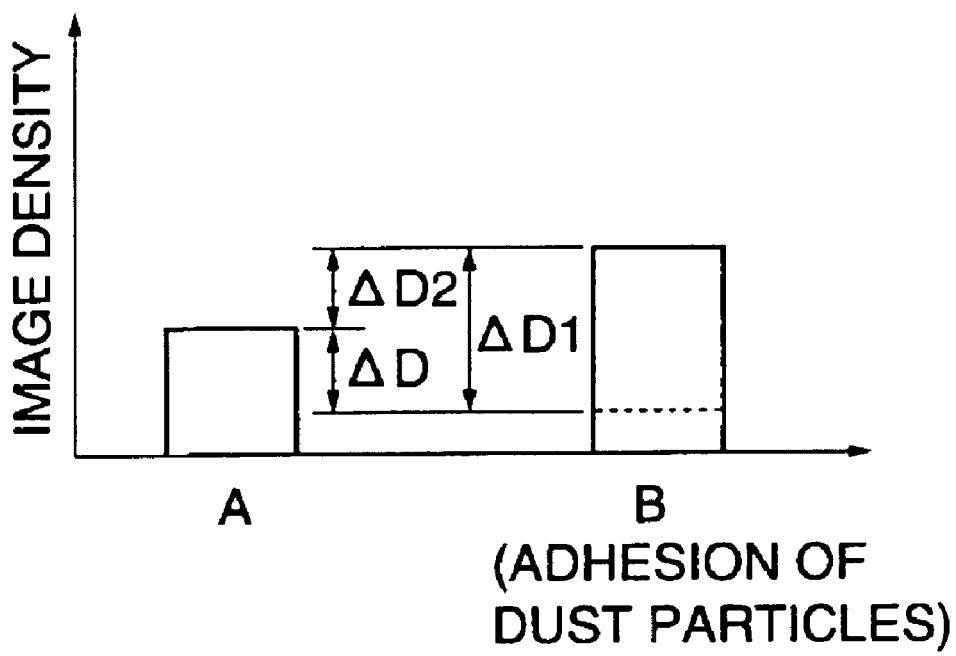

The density correction circuit 118 is, as shown in FIG. 9, constructed of average value computing circuits 135 and 136, a subtraction circuit 137 and an addition circuit 138. To the average value computing circuits 135 and 136, there are inputted image data pieces A and B corresponding to the same image obtained in the upstream-side reading position and the downstream-side reading position. The average value computing circuit 135 determines an average value for 64 pixels on the image data A. Also, the average value computing circuit 136 determines the same number of pixels as the average value computing circuit 35, that is, the average value for the image data B for 64 pixels. When the average value for the image data B determined by the average value computing circuit 136 is deducted from the average value for the image data A determined by the average value computing circuit 135 and each density value for the image data pieces A and B obtained from the same point on an original is compared, the subtraction circuit 137 outputs average value difference data representing how much the former is higher in average than the latter. This average value difference data corresponds to the above-described offset. The image data B is subjected to correction to add this average value difference data by the addition circuit 138, which outputs the post-correction image data B.

The configuration of the streak detection circuit 119 is as shown in FIG. 10. This streak detection circuit 119 has, unlike the streak detection circuit 19 according to the first embodiment, no threshold correction circuit, but a threshold from the CPU 22 is given as it is to the comparison circuit 27. Also, to the comparison circuit 25 and the subtraction circuit 26, the image data A from the output delay circuit 18 and the post-correction image data B from the density correction circuit 118 are given. Since this is the same as the streak detection circuit according to the first embodiment in other respects, the same reference numerals as those used in FIG. 4 are used, and a description thereof will be omitted.

The configuration of the streak removal circuit 120 is as shown in FIG. 11. This streak removal circuit 120 has no circuit corresponding to the addition circuit 39 according to the first embodiment, but post-correction image data B from the density correction circuit 118 is given to a selection circuit 40. Since this is the same as the streak removal circuit according to the first embodiment in other respects, the same reference numerals as those used in FIG. 6 are used, and a description thereof will be omitted.

In the first embodiment, the threshold for judging whether the difference between the image data A and the image data B is large or small has been corrected on the basis of the average value difference data. In contrast, in the present embodiment, in place of such correction of the threshold, the image data B is subjected to correction to add the average value difference data by the density correction circuit 118. In the streak detection circuit 119, depending upon whether or not a difference obtained by deducting the post-correction image data B from the image data A exceeds a predetermined threshold, the presence or absence of black streaks caused by adhesion of dust particles is judged. By this judgment, it is found that image data having a high density value has black streaks. If it has been found that there are black streaks and the density value of the image data A is high, the image data A is replaced with the post-correction image data B in the streak removal circuit 120. Also, when the black streak removal data is "0", the image data B may be outputted. In this case, if it is found that there are black streaks and the image data B has a high density value, the post-correction image data B is replaced with the image data A in the streak removal circuit 120. Even in the present embodiment, the same effect as the first embodiment can be obtained.

According to an image reader according to the present invention as described above, even if there exists a density difference between each read image corresponding to the same image in plural reading positions, there is the effect that it is possible to accurately detect streak-shaped noise caused by the adhesion of dust particles to the reading unit, or the like, and to remove it from the output image.

What is claimed is:

1. An image reader having a conveying part that conveys an original, and first and second reading parts that read the original conveyed by the conveying part, in which if the same image has been read by the first and second reading parts, a density value of a read image obtained from the first reading part is higher than a density value of a read image to be obtained from the second reading part, comprising:

a noise detection part that judges, if a difference between density values of the same area on the original read by the first and second reading parts, respectively, exceeds a predetermined threshold, that a streaks-shaped noise is contained in the read image obtained by the first reading part; and a noise removal part that generates, if the noise detection part judges that the streaks-shaped noise is not contained in the read image obtained by the first reading part, an output image using the read image obtained by the first reading part, and that generates, if the noise detection part judges that the streaks-shaped noise is contained in the read image obtained by the first reading part, the output image using the read image obtained by the second reading part.

2. The image reader according to claim 1, wherein the difference between density values of the same area on the original read by the first and second reading parts is obtained by deducting the density value obtained by the second reading part from the density value obtained by the first reading part.

3. An image reader having a conveying part that conveys an original, and first and second reading parts that read the original conveyed by the conveying part, in which if the same image has been read by the first and second reading parts, a density value of a read image obtained from the first reading part is higher than a density value of a read image to be obtained from the second reading part, comprising:

a threshold correction part that determines an average density difference between average densities of the same area on the original read by the first and second reading parts, respectively, and that corrects a predetermined threshold on the basis of the average density difference and outputs the corrected threshold;

a noise detection part that judges, if a difference between density values of the same area on the original read by the first and second reading parts, respectively, exceeds the threshold outputted from the threshold correction part, that a streaks-shaped noise is contained in the read image obtained by the first reading part;

a correction part that corrects the read image obtained by the second reading part on the basis of the average density difference determined by the threshold correction part; and a noise removal part that generates an output image using the read image obtained by the first reading part, if the noise detection part judges that the streaks-shaped noise is not contained in the read image obtained by the first reading part, and generates the output image using the read image obtained by the second reading part, which has been subject to the correction by the correction part, if the noise detection part judges that the streaks-shaped noise is contained in the read image obtained by the first reading part.

4. The image reader according to claim 3, wherein the difference between density values of the same area on the original read by the first and second reading parts is obtained by deducting the density value obtained by the second reading part from the density value obtained by the first reading part.

5. An image reader, having a conveying part that conveys an original, and first and second reading parts that read the original to be conveyed by the conveying part, in which if the same image has been read by the first and second reading parts, a density value of a read image to be obtained from the first reading part is higher than a density value of a read image to be obtained from the second reading part, comprising:

a correction part that corrects the read image of either the first or second reading part to reduce an average density difference between average densities of the same area on the original read by the first and second reading parts, respectively; and a noise detection part that judges, after the read image obtained by either the first or second reading part has been corrected by the correction part, if a difference between density values of the same area on the original read by the first and second reading parts, respectively, exceeds a predetermined threshold, that a steaks-shaped noise is contained in the read image obtained by either the first or second reading part that has a higher density value.

6. The image reader according to claim 5, further comprising:

a noise removal part that generates, if the noise detection part judges that the streaks-shaped noise is not contained in the read image obtained by the first or second reading part having the higher density value, an output image using the read image obtained by the reading part having the higher density value, which has been subjected to the correction by the correction part, and that generates, if the noise detection part judges that the streaks-shaped noise is contained in the read image obtained by the reading part having the higher density value, the output image using the read image obtained by the other reading part having lower density value, which has been subjected to the correction by the correction part.

7. An image reading method that reads an image by a first reading part from an area on an original conveyed by a conveying part, and then reads the image by a second reading part from the same area on the original to generate an output image, in which a density value of a read image obtained by the second reading part is lower than a density value of a read image obtained by the first reading part, comprising the steps of:

judging whether a difference between the density values of the read images obtained by the first and second reading parts, respectively, exceeds a predetermined threshold; and generating, if it is judged that the difference does not exceed the predetermined threshold, the output image using the read image obtained by the first reading part, and generating, if it is judged that the difference exceeds the predetermined threshold, the output image using the read image obtained by the second reading part.

8. The image reading method according to claim 7, wherein the difference between the density values of the read images obtained by the first and second reading parts is obtained by deducting the density value obtained by the second reading part from the density value obtained by the first reading part.

9. An image reading method that reads an image by a first reading part from an area on an original conveyed by a conveying part, and then reads the image by a second reading part from the same area on the original to generate an output image, in which a density value of a read image obtained by the second reading part is lower than a density value of a read image obtained by the first reading part, comprising the steps of:

determining an average density difference between average densities of the same area on the original read by the first and second reading parts, respectively:

correcting a predetermined threshold and the read image obtained by the second reading part on the basis of the average density difference;

judging whether a difference between the density values of the read images obtained by the first and second reading parts, respectively, exceeds the corrected threshold; and generating, if it is judged that the difference does not exceed the corrected threshold, the output image using the read image obtained by the first reading part, and generating, if it is judged that the difference exceeds the corrected threshold, the output image using the read image obtained by the second reading part.

10. The image reading method according to claim 9, wherein the difference between the density values of the read images obtained by the first and second reading parts is obtained by deducting the density value obtained by the second reading part from the density value obtained by the first reading part.

11. An image reading method that reads an image by a first reading part from an area on an original conveyed by a conveying part, and then reads the image by a second reading part from the same area on the original to generate an output image, in which a density value of a read image obtained by the second reading part is lower than a density value of a read image obtained by the first reading part, comprising the steps of:

correcting at least one of the read images obtained by the first and second reading parts, respectively, to reduce an average density difference between average densities of the same area on the original read by the first and second reading parts, respectively;

judging whether a difference between the density values of the read images, at least one of which has been corrected, obtained by the first and second reading parts, respectively, exceeds a predetermined threshold; and generating, if it is judged that the difference does not exceed the predetermined threshold, the output image using the read image obtained by the first reading part, and generating, if it is judged that the difference exceeds the predetermined threshold, the output image using the read image obtained by the second reading part.

* * * * *